United States Patent [19]

Langenohl et al.

[11] Patent Number: 5,753,572
[45] Date of Patent: May 19, 1998

[54] CASTABLE AND GUNNING COMPOSITION WITH IMPROVED RESISTANCE TO BUILD-UP AND ALKALI INFILTRATION

[75] Inventors: Mark C. Langenohl, Pittsburgh; Christopher L. Macey, Venetia, both of Pa.

[73] Assignee: Harbison-Walker Refractories Company, Dallas, Tex.

[21] Appl. No.: 672,252

[22] Filed: Jun. 28, 1996

[51] Int. Cl.⁶ .................... C04B 35/103; C04B 35/106
[52] U.S. Cl. ................ 501/89; 501/107; 501/124; 501/128
[58] Field of Search .................. 501/89, 107, 128, 501/124

[56] References Cited

U.S. PATENT DOCUMENTS

| | | |
|---|---|---|
| 3,067,050 | 12/1962 | Miller ................................. 501/128 |
| 3,164,482 | 1/1965 | Renkey. |
| 3,230,100 | 1/1966 | Davies et al. ........................ 501/89 |
| 3,342,615 | 9/1967 | Miller ................................. 501/89 |
| 3,992,214 | 11/1976 | Petrak. |
| 4,111,711 | 9/1978 | Kiehl et al.. |
| 4,978,410 | 12/1990 | Clark et al.. |
| 5,147,834 | 9/1992 | Banerjee. |

FOREIGN PATENT DOCUMENTS 983567  2/1965  United Kingdom ............. 501/107

*Primary Examiner*—Karl Group
*Attorney, Agent, or Firm*—Craig C. Cochenour

[57] ABSTRACT

Mixes suitable for casting or gunning containing a heat-resistant aggregate blend containing at least about 50 wt. % high alumina grain, silicon carbide, and zircon sand, and to the method of utilizing the same to form alkali-resistant linings in high temperature vessels that have improved resistance to build-up.

23 Claims, No Drawings

CASTABLE AND GUNNING COMPOSITION WITH IMPROVED RESISTANCE TO BUILD-UP AND ALKALI INFILTRATION

BACKGROUND OF THE INVENTION

The present invention relates to high alumina castable and gunning compositions which are especially useful in Portland cement kiln preheaters.

The increasing use of alternate fuels, such as shredded rubber tires and other combustible waste, in cement kilns has increased the severity of undesired build-up in cement kiln preheaters. The alternate fuel combustion products, such as sulfur and halogens, combine with cement feed constituents, condense in the preheater and build-up on the refractory lining thereof. In some instances the build-up is so severe that production has to be interrupted to physically remove the same.

In such preheaters there is also the problem of alkali buildup and infiltration of the refractory lining which can greatly limit the useful life thereof.

While it is known to utilize silicon carbide-based refractories to resist cement kiln build-up, they are not entirely suitable to prevent build-up and alkali infiltration in the harsh environments created in preheaters when alternate fuels are used. The same is true with the use of zircon-based refractories.

SUMMARY OF THE INVENTION

The present invention overcomes the deficiencies of prior castable and gunning composition to provide compositions having greatly improved resistance to build-up and alkali infiltration.

Briefly stated, the present invention comprises a mix for forming a refractory suitable for casting or gunning comprising a high alumina aggregate, calcium aluminate cement, and about 10 to 30 combined wt. % silicon carbide and zircon sand.

The invention also comprises the resultant casting and gunning compositions and the method of forming alkali-resistant linings in cement kiln preheaters that also have improved resistance to build-up as more fully described below.

DETAILED DESCRIPTION

As to the mix, it comprises as the major constituent, any aggregate suitable for forming casting and gunning compositions resistant to high temperatures. Most suitably, high alumina aggregates are utilized, i.e., those containing at least about 50 wt. % and up to 99 wt. % alumina. As is common in making casting and gunning compositions it is preferred to use a graded high- alumina aggregate in which the mesh size can vary from ball mill fines to 3½ mesh, or higher, dependent upon the particular use. All mesh sizes set forth herein are Tyler Standard.

The other essential element of the mix and compositions is a mixture, or blend, of silicon carbide and a zircon sand. While any commercially available silicon carbide can be used, it is preferred to use -100 or -200 mesh 96 grade silicon carbide. i.e., a grade containing 96 wt. % SiC, with the remainder mainly silica ($SiO_2$). As to the zircon sand it is preferred to use granular material which is unground and having an approximate 60% +200 mesh sizing.

As to the proportions of zircon sand and silicon carbide used, it is preferred to use 2 parts by weight of zircon and for each part by weight of silicon carbide, although this ratio can vary widely, from about 1:10 to 10:1.

For each 100 weight % of the mix, it is preferred to use at least about 60 wt. % of the high alumina refractory and about 10 to 30 wt. % of a blend of silicon carbide and zircon sand. In forming the mix, the silicon carbide and zircon sand can be added separately to the blender, or other mix-forming means, or pre-mixed and then added.

In addition to the two essential components noted above, there is also included a calcium aluminate cement and a plasticizer such as a clay for gun mixes or a densifier and flow aid such as microsilica for castables.

The calcium aluminate cement is preferably a high purity type consisting essentially of $Al_2O_3$ and CaO. The amount utilized will vary dependent upon the use, with 5 to 20 wt. % utilized for gunning mixes and 3 to 10 wt. % for castable mixes for each 100 wt. % of the mix. The clay is any type conventionally used in gun mixes, most suitably a ball clay, and the microsilica is any type conventionally used in castables. Ordinarily for each 100 wt. % of the mix, 2–10 wt. % clay and 3 to 10 wt. % microsilica can be used.

Other known additives to castable and gun mixes can also be utilized in their usual amounts and for their usual purposes. These include dispersants, preferably sodium phosphates such as sodium tripolyphosphate, sodium hexametaphosphate, and trisodium phosphate and organic and inorganic fibers to help minimize cracking once the castable and gunning mixes have been applied as a refractory lining, and are in use, and also additives known to those skilled in this art may be included to modify setting characteristics.

The compositions are prepared in the conventional manner. Castables are blended by admixing the solids with water in any conventional refractory blender, such as a paddle mixer, and then cast as is conventional. The gunning compositions are formed by admixing the solids as above, but water is later added using any conventional gunning system.

The mixes and resultant compositions formed therefrom are especially suitable, but not limited to, use in cement kiln preheaters particularly, those systems utilizing alternate fuels, such as tires and other waste as fuel supplements. They are easily applied as original linings or to repair linings using commercially available installation equipment. The resultant linings show excellent resistance to alkali infiltration and build-up. Equally importantly, when build-up occurs it is more readily removed from the lining.

The invention will be further described in connection with the following examples which are set forth for purposes of illustration only.

EXAMPLES 1 TO 3

Three compositions were prepared from the components set forth in Table I below with Example 1 being a gun mix and Examples 2 and 3 being castables.

TABLE I

| Example No. | 1 | 2 | 3 |
|---|---|---|---|
| Mix: | | | |
| High Alumina Aggregate, −½ + 3½ mesh | — | 10% | 10% |
| High Alumina Aggregate, 3/10 | 25.5% | 31 | 25.5 |
| High Alumina Aggregate, 10/28 | 27 | 14 | 15 |
| High Alumina Aggregate, 28/65 | 5 | 9 | 9 |
| High Alumina Aggregate, BMF | 4.5 | 7 | 11.5 |

TABLE I-continued

| Example No. | 1 | 2 | 3 |
|---|---|---|---|
| Zircon Sand, −65 m | 10 | 10 | 10 |
| Silicon Carbide, −100 m | 5 | 5 | 5 |
| Ball Clay | 8 | — | — |
| Microsilica | — | 7 | 7 |
| Calcium Aluminate Cement | 15 | 7 | 7 |
| Plus Additions: | | | |
| Dispersant | — | 0.5 | 0.5 |
| Organic Fibers | 0.15 | 0.15 | 0.15 |

The gun mix of Example 1 was mixed dry in a cone blender and gunned into a panel using a Blastcrete rotary gun. The product was tested and the results are set forth in Table II below.

TABLE II

| Example 1 | |
|---|---|
| % Predamp: | 5% |
| Gun Used: | Blastcrete |
| Air Pressure, psi: | 40 |
| Rotor/Motor Pressure, psi: | 600 |
| Water Pressure, psi | 150 |
| % Rebounds: | 9% |
| Moisture, % | |
| Panel: | 9.6 |
| Rebounds: | 5.4 |
| Gunning Characteristics: | |
| Water Range: | Wide |
| Water Control: | Good |
| Feed: | Even |
| Build-up: | Good |
| Panel Appearance: | Good |
| Comments: | Gunned Well |
| Bulk Density, pcf | |
| After Drying at 230° F. | 141 |
| After 1500° Reheat | 134 |
| After 2700° Reheat | 123 |
| Modulus of Rupture, psi | |
| After Drying at 230° F. | 920 |
| After 1500° F. Reheat | 410 |
| Cold Crushing Strength, psi | |
| After Drying at 230° F. | 2880 |
| After 1500° F. Reheat | 2720 |
| 1500° F. Reheat | |
| % Linear Change: | −0.2 |
| % Volume Change: | −1.4 |
| 2700° F. Reheat | |
| % Linear Change: | +3.0 |
| % Volume Change: | +9.6 |
| Visual Appearance | Good. One sample had minor cracks. |
| ASTM C-704 Abrasion Test | |
| After 1500° F. Reheat | |
| Volume Eroded, cc: | 42.3 |

The castable mixes of Examples 2 and 3 were each separately blended and mixed with water in a paddle mixer, cast into 9×4½×2-inch gang molds and then tested. The results are set forth in Table III below.

TABLE III

| Example No. | 2 | 3 |
|---|---|---|
| % Water for Casting: | 5.2 | 5.2 |
| % Flow: | 122 | 105 |
| Comments: | Granular | Well Filled |
| Bulk Density, pcf | | |
| After Drying at 230° F.: | 159 | 159 |
| After 1500° F. Reheat: | 153 | 154 |
| After 2700° F. Reheat: | 152 | 152 |
| Modulus of Rupture, psi | | |
| After Drying at 230° F.: | 1840 | 2390 |
| After 1500° Reheat: | 1990 | 2330 |
| Cold Crushing Strength, psi | | |
| After Drying at 230° F.: | 8310 | 12,850 |
| After 1500° F. Reheat: | 7980 | 9,380 |
| 1500° F. Reheat | | |
| % Linear Change: | −0.2 | −0.2 |
| % Volume Change: | −0.2 | −0.2 |
| 2700° F. Reheat | | |
| % Linear Change: | +0.7 | +0.6 |
| % Volume Change: | +2.3 | +1.3 |
| Visual Appearance: | Good. No cracking | Good. No cracking |

EXAMPLE 4

The gun mix of Example 1 was installed as a lining in the preheater feed shelf of a cement kiln preheater. After three months, the lining was inspected and did not exhibit signs of build-up. The lining also withstood abrasion from the feed material and the gas flow.

EXAMPLE 5

The gun mix of Example 1 and castable of Example 3 were installed in different areas of a cement kiln preheater.

The gun mix was installed in the riser duct below the precalciner. Any build-up that formed during operation was readily removed.

The castable was installed in the tertiary air duct offtake. With the previous lining, this area had to be cleaned approximately twice a day. With the lining formed of the castable of the instant invention, this area was cleaned only once in three months.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A granular mix for forming a refractory suitable for casting or gunning comprising an aggregate blend containing at least about 50 wt. % high alumina grain, silicon carbide, zircon sand and calcium aluminate cement.

2. The granular mix of claim 1 for coating also containing a microsilica.

3. The granular mix of claim 1 for gunning also containing a clay.

4. The granular mix of claim 1, wherein said high alumina grain contains from about 50 to 99 wt. % alumina, said silicon carbide contains at least 96 wt. % SiC, and said zircon sand is unground and granular.

5. The granular mix of claim 1 wherein, for each 100 wt. % of the mix, there is at least about 60 wt. % of said high alumina grain and about 10 to 30 wt. % total of said silicon carbide and zircon sand, the ratio of parts by weight silicon carbide to parts by weight of zircon sand varying from about 10:1 to 1:10.

6. The granular mix of claim 2, wherein for each 100 wt. % of mix, the mix comprises 3 to 10 wt. % calcium aluminate cement and 3 to 10 wt. % microsilica.

7. The granular mix of claim 3, wherein for each 100 wt. % of mix, the mix comprises 5 to 20 wt. % calcium aluminate cement and 2 to 10 wt. % clay.

8. A composition suitable for casting or gunning comprising an aggregate blend containing at least about 50% high alumina grain, silicon carbide, zircon sand, calcium aluminate cement and water in an amount sufficient to place the composition in condition for application.

9. The composition of claim 8 for casting also containing a microsilica.

10. The composition of claim 8 for gunning also containing a clay.

11. The composition of claim 8, wherein said high alumina grain contains from about 50 to 99 wt. % alumina, said silicon carbide contains at least 96 wt. % SiC, and said zircon sand is unground and granular.

12. The composition of claim 8 wherein, for each 100 wt. % of the mix, there is at least about 60 wt. % of said high alumina grain and about 10 to 30 wt. % total of said silicon carbide and zircon sand, the ratio of parts by weight silicon carbide to parts by weight of zircon sand varying from about 10:1 to 1:10.

13. The composition of claim 11, wherein for each 100 wt. % of mix, the mix comprises 3 to 10 wt. % calcium aluminate cement and 3 to 10 wt. % microsilica.

14. The composition of claim 12, wherein for each 100 wt. % of mix, the mix comprises 5 to 20 wt. % calcium aluminate cement and 2 to 10 wt. % clay.

15. A refractory lining for a high temperature vessel comprising an aggregate blend containing at least about 50 wt. % high alumina grain, silicon carbide, zircon sand, and calcium aluminate cement.

16. The refractory lining of claim 15 for coating also containing a microsilica.

17. The refractory lining of claim 15 for gunning also containing a clay.

18. The refractory lining of claim 15, wherein said high alumina grain contains from about 50 to 99 wt. % total alumina, said silicon carbide contains at least 96 wt. % SiC, and said zircon sand is unground and granular.

19. The refractory lining of claim 15 wherein, for each 100 wt. % of the mix, there is at least about 60 wt. % total of said high alumina grain and about 10 to 30 wt. % of said silicon carbide and zircon sand, the ratio of parts by weight silicon carbide to parts by weight of zircon sand varying from about 10:1 to 1:10.

20. The refractory lining of claim 16, wherein for each 100 wt. % of mix, the mix comprises 3 to 10 wt. % calcium aluminate cement and 5 to 10 wt. % microsilica.

21. The refractory lining of claim 17, wherein for each 100 wt. % of mix, the mix comprises 5 to 20 wt. % calcium aluminate cement and 2 to 10 wt. % clay.

22. A granular mix for forming a refractory suitable for casting or gunning comprising an aggregate blend consisting essentially of at least about 50 wt. % high alumina grain, about 10 to 30 wt % total of silicon carbide, and zircon sand.

23. The granular mix of claim 22, further containing a calcium aluminate cement.

* * * * *